J. HIESTAND.
Bee Hive.
No. 70,436. Patented Nov. 5, 1867.
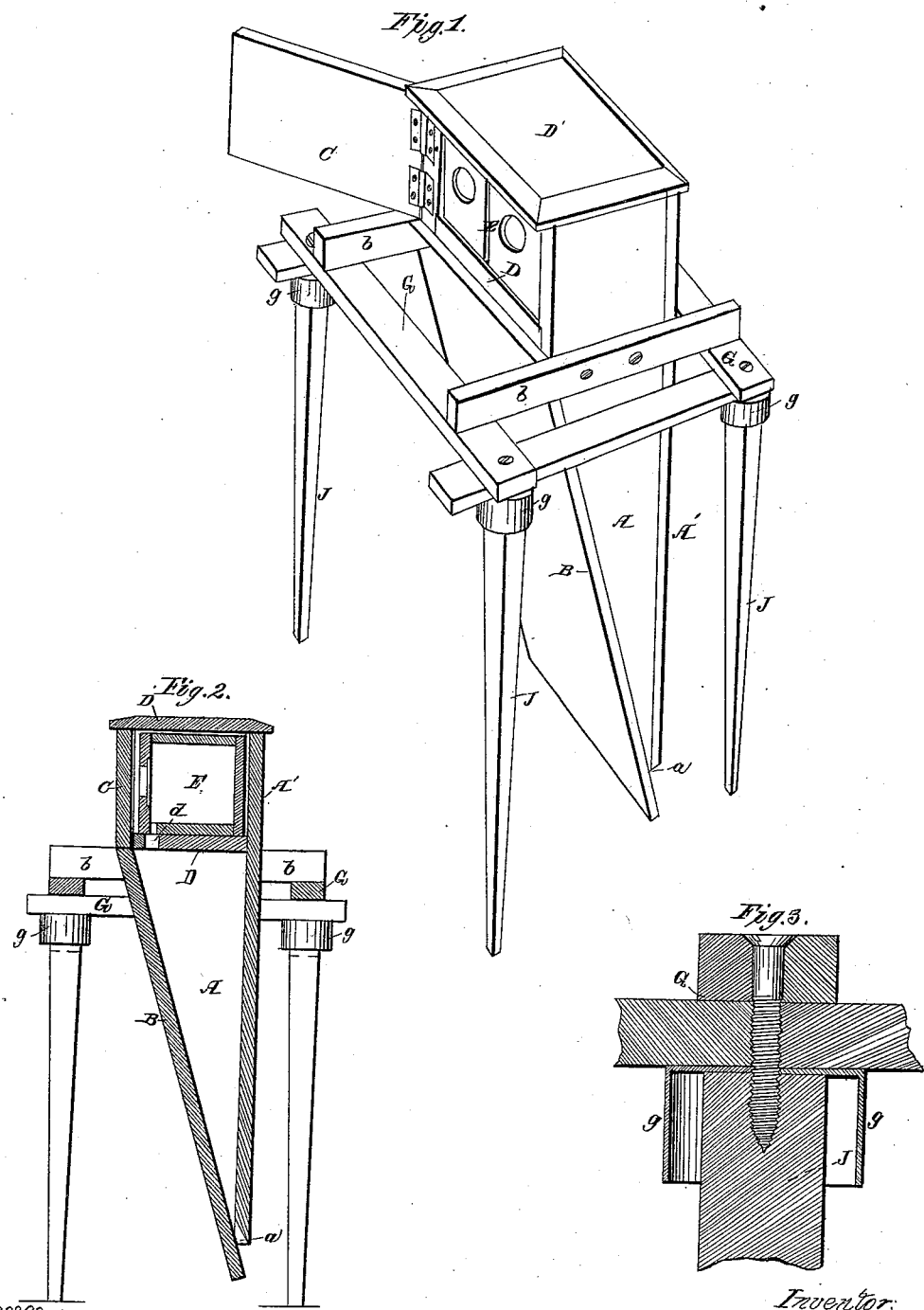

United States Patent Office.

JESSE HIESTAND, OF PALESTINE, ILLINOIS.

Letters Patent No. 70,436, dated November 5, 1867.

IMPROVEMENT IN BEE-HIVES.

*The Schedule referred to in these Letters Patent and making part of the same.*

TO ALL WHOM IT MAY CONCERN:

Be it known that I, JESSE HIESTAND, of Palestine, in the county of Crawford, and State of Illinois, have invented a new and improved Bee-Hive; and I do hereby declare that the following is a full, clear, and exact description thereof, reference being had to the accompanying drawings making a part of this specification, in which—

Figure 1 is a perspective view of the improved hive complete.

Figure 2 is a vertical central section through the hive.

Figure 3 is a sectional view, enlarged, of one of the inverted cup-protectors for the hive.

Similar letters of reference indicate corresponding parts in the several figures.

The object of this invention is to protect bees from the ravages of the bee-moth by constructing the body of the hive with three vertical sides, and one inclined or sloping side, which latter forms a narrow entrance for the bees, and affords a footing for them inside of the hive, to enable them to expel the moth-worm. And in conjunction with a hive of this description, a chamber is provided at its upper end for the storing of honey for family use, which chamber is separated from the hive proper by a partition, upon which the honey-drawers or frames are supported, and through which small holes are made for the passage of the bees. Provision is also made for preventing the return of the moth-worm after it has been once expelled from the hive, all as will be hereinafter explained.

To enable others skilled in the art to understand my invention, I will describe its construction and operation.

The body of the hive, or that portion of it in which the bees lay up their winter store, consists of three vertical portions, A A A', and an inclined portion, B, which latter extends from the bottom of a door, C, down below the lower ends of the side pieces A A A', and forms a narrow oblong entrance, $a$, for the bees, which entrance is on the opposite side of the hive to that on which the door C is arranged, as shown in figs. 1 and 2. The side pieces A A A' extend above the partition D, and form three sides of the chamber E, the other two sides being formed by the board or cover D' and the hinged door C. The chamber E is provided with removable drawers or suitable frames, in which the bees store the honey for family use, entrance being made for the bees through small holes, $d$, which are made through the partition D, as shown in fig. 2. When it is desired to have the bees make honey for their own consumption during the winter, the holes $d$ are closed by means of slides or otherwise, and access for the bees to the chamber E cut off. The bees then lay up their honey in the body of the hive below the partition D. To the side pieces A A, near the top of the body of the hive, short bars $b\ b$ are secured, the ends of which project out and rest upon a frame, G, having four legs, J, as clearly shown in the drawings. The legs of frame G have inverted cups, $g$, secured upon their upper ends, by means of the same screws which are used to secure the frame and legs together, as shown in fig. 3. These inverted cups $g$ are designed for preventing the miller or moth-worms from crawling back into the hive after their expulsion by the bees. The cups being made of thin sheet metal, and applied so as to overhang the upper ends of the legs, will effectually prevent worms from having access to the hive.

It will be seen from the above description that there is no lodgment left in the body of the hive for the worms, and that as soon as they are hatched the bees can readily expel them. It will also be seen that the hive is divided into two apartments, one above the other, the lower apartment being designed exclusively for the bees, and the upper apartment being that in which the honey is made for family use.

Having described my invention, what I claim as new, and desire to secure by Letters Patent, is—

The construction of the body or lower portion of the hive of three vertical boards, A A A', and one inclined or sloping board, terminating at the bottom in a narrow entrance, $a$, and at the top in a honey-chamber, E, said hive being supported upon a frame, G, which is provided with protectors, $g$, substantially as described.

JESSE HIESTAND.

Witnesses:
    WILLIAM IRELAND,
    A. E. BRISTOL.